Aug. 9, 1966 J. T. DALE 3,265,457
MOTION PICTURE VIEWER AND FILM ADVANCE MECHANISM
Filed June 12, 1964
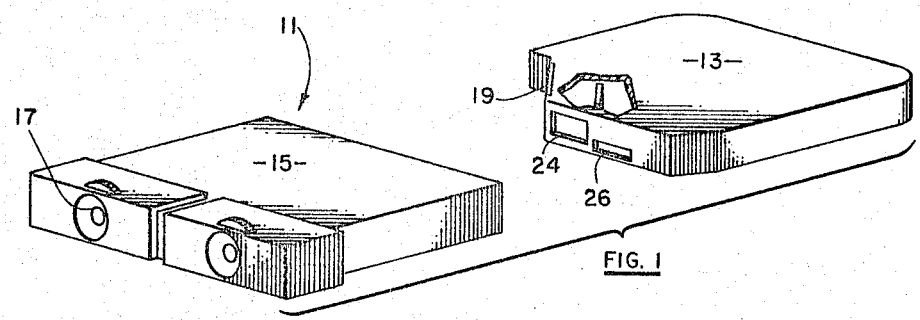
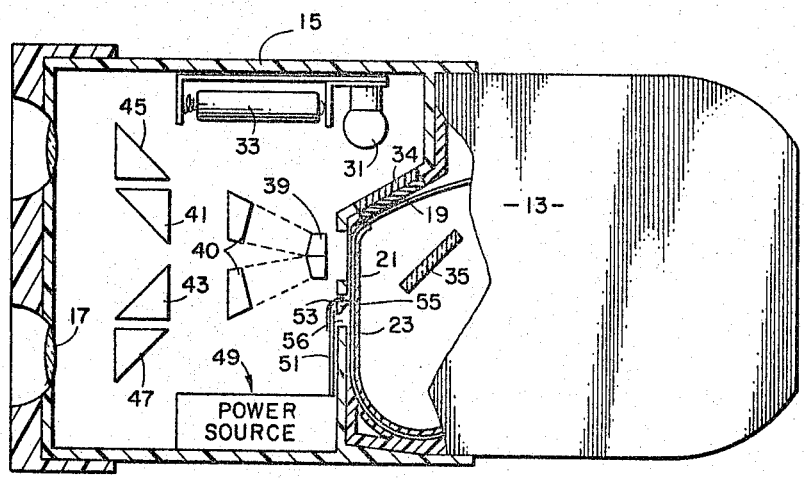
INVENTOR.
JAMES T. DALE
BY
Stuart W. Wohlgemuth
ATTORNEY

United States Patent Office 3,265,457
Patented August 9, 1966

3,265,457
MOTION PICTURE VIEWER AND FILM
ADVANCE MECHANISM
James T. Dale, 3145 Haddington Drive,
Los Angeles, Calif.
Filed June 12, 1964, Ser. No. 374,679
5 Claims. (Cl. 352—129)

This invention relates to a motion picture camera and projector. More particularly, the invention relates to a mechanism for advancing film in projectors and cameras and to a miniature viewer incorporating this mechanism.

Prior to this invention commonly known movie projectors and cameras operated similarly to the old magic lanterns. The principal of this old device was that the film was advanced or moved while the shutter was closed for an instant after each picture was shown on the screen or exposed. After the advance of the film, the shutter blades then opened to show the next picture or expose the next frames. To accomplish this in the available projectors and cameras, one roll of film is a take-up roll and is power driven with a friction plate to limit tension on take up. Additionally, means are provided to move the film past the shutter at the instant it closes. The construction, actuation and timing of the shutter is, of course, quite critical. This particular arrangement and construction is quite costly, has a considerable number of moving parts as can be appreciated, and thus is relatively complicated in construction. Cameras and projectors of this nature are heavy and take up too much space.

Thus it is an object of this invention to provide a shutterless means for projecting film.

A further object of this invention is to provide a mechanism for advancing film in either projectors or cameras light in weight and inexpensive in construction.

Still another object of this invention is to provide a mechanism for advancing movie film which uses a basic electrical high speed pulse timing system.

Still another object of the invention is to provide a mechanism for advancing movie film which would have a high reliability due to simplicity of construction.

One further object of the invention is to provide a small, miniature motion picture projector utilizing the film advance mechanism of this invention.

These and other objects will become apparent from the following detailed description:

The film advance mechanism of this equipment broadly comprises a power source actuating a solenoid. The circuitry of the power source is such that the solenoid is actuated in a given time interval at a fixed constant rate. Fixed to one end of the solenoid member is an elongated straight spring which lies in the same plane as the solenoid, and is actually an extension thereof. At the end of the elongated spring member, opposite the solenoid is a film catch means, which is connected to the elongated spring member by a relatively light spring. The film catch mechanism is essentially perpendicular to the elongated spring member and serves to catch the film. After the solenoid is actuated means are provided to force it back towards the initial starting position, thus giving a reciprocating motion to the solenoid and the elongated spring member attached thereto. Due to the timed regular movements of the solenoid and the film catch mechanism which catches the film at the perforations provided along one edge, the film is advanced the appropriate distance after exposure or viewing. By construction of the device and the timing thereof, the film may be advanced quite rapidly compared to the viewing time. Thus the movement would not be apparent to the eye. In the case of stereo viewing, two exposed frames in a projector or camera would be advanced by the mechanism. A miniature device may incorporate such a mechanism utilizing an essentially conventional film cartridge with means provided for viewing the film in the case or projector and further incorporating the film advance mechansm. The unit by being battery powered would thus be self-contained portable and quite easy to use. The invention will be explained in more detail in the following description with relation to the figures in which:

FIG. 1 is a pictorial view of the novel projector of the invention.

FIG. 2 is a partially sectioned pictorial top view of the projector of the invention.

FIG. 3 is a schematic electrical diagram of the power source for actuating the film advance mechanism of the invention.

FIGS. 4a, 4b, 4c are cross-sectional views of the film advance mechanism of the invention showing the movement of the mechanism in advancing the film.

Referring now to FIG. 1 there is shown the two basic components that comprise the small compact hand-held viewer utilizing the film advance concepts of this invention. The projector will operate as a complete unit and can be put in the coat pocket, carried into the field or the businessman's brief case with several magazines of film. The projector device of FIG. 1 is comprised of two units. The first is the film cartridge 13 which is standardly used. The second major component of the projector is the housing 15 containing the film advance mechanism light source and optical system and through which the viewing of the film transpires. The housing 15 is provided with two eyepieces 17 through which the film can be viewed. The eyepieces 17 are movable to adjust for astigmatism focus and eye span. There is particularly seen in FIG. 2 as well as FIG. 1 the cartridge 13 is provided with a clear plastic or glass window 19 in the side thereof for admitting light behind the film so that the image may be viewed. Additionally, there is provided in the cartridge a film track 21 which serves to position the film 23. Adjacent is a slot 26 through which the film advance mechanism of this invention reciprocates for moving the film. Within the housing 15 there is provided a light source 31 and the battery for supplying the energy. A conventional switch, not shown, is provided on the side of the device for actuating the light. A plastic window 34 is provided inside of the case 15 adjacent the window 19 in the cartridge. The light may then travel through the windows 34 and 19 to a mirror 35 provided in the cartridge which reflects the light through the film for viewing. Optics 39 are a pair of focal plane enlarging lenses sending the images on the oblique. Optic pair 40 returns the image to the parallel and transfers the correct dimension image to the prismatic mirrors 41 and 43. Optics 41 and 43 are mere prismatic mirrors and bend the light 90 degrees. Optics 45 and 47 are additionad prisms and again bend the light 90 degrees for viewing through the openings 47 in the eyepieces 17. Additionally within the housing 15 is situated the power source 49 actuating an elongated spring 51 in a reciprocable motion as will be explained. At the upper end of the elongated spring 51 is a fine flexible spring affixed to the film catch 55. The light spring 53 and film catch 55 extend through an aperture 56 provided in the housing 15 adjacent the opening or aperture 26 in the cartridge.

FIG. 3 is a diagram of the power supply which serves to actuate the film advance mechanism of the invention. The power source is a battery 57 which may be either a mercury or conventional construction. The exact voltage control is obtained through the utilization of a bi-pole diode 59 in the output section of the circuit. The electrical energy is converted into the mechanical energy through the solenoid mechanism 61. The feed-back mechanism consists of a Zener diode 63, two resistors 65 and 67 and two transistors 69 and 71, respectively. The feed-back is amplified by an amplification power transistor 73. The capacitor 75 smooths the power input and degenerates possible oscillation of modulation which may occur as a result of rapid pulse strain from the battery. The Zener diodes keep the battery drained, when a spring 77 serves to return the solenoid after it has been actuated to a start position. Upon its return the solenoid will close switch 79 so that it will be reactivated. The force of the solenoid thus must be sufficient to overcome the resistance of the return spring 77 and the friction resistance of the plastic track 21 in FIGURE 1 plus the spring 53. Within the particular embodiment of the invention, the solenoid has movement of .30 of an inch from off to on position. Connected to the solenoid is the elongated spring or arm 51 which serves as part of the film advance mechanism.

In the particular embodiment a 15 millisecond capacitor is utilized. Every 70 milliseconds the solenoid is actuated. It has been found that the advance of the film through the movement of the solenoid and return thereof by the spring 77 transpires within a 70 millisecond period. Thus the image is viewed for 55 milliseconds while the advancement of the film transpires within a 15 millisecond period. To the eye the movement is so much more rapid than the time hold period when the frame is viewed that the movement is not readily apparent. The mind will accept only the longest time image, that is, the time in which the frame is held and not that in which the frame is transferred.

FIGS. 4a to 4c depict in detail the method by which the film is advanced in accord with the invention. There is shown in FIG. 4a the elongated straight spring member 51 which is connected to the solenoid and which extends parallel to the face of the film. Connected to the spring 51 is a light spring 53 which curves to a right angle to spring 51. Fixedly secured to spring 53 is the film catch 55 which has a pointed front end 81 and a curved surface 82. The film as does all movie films has a plurality of evenly spaced openings 83 which normally receive a sprocket which serves to rotate and advance the film. The apertures 83 are spaced between the frames of the film 85.

In FIG. 4a the elongated spring arm 51 is fully extended such that the catch 81 is within an aperture 83 and abutting a frame 85 serving to push the film past the viewing lens. A length of movement of the arm is such that it moves in a stereo film two frames at a time. In FIG. 4a where the catch is situated within the opening 83 and abutting the frame 85, the actuation of the solenoid causes the arm to moves to the right in accord with the arrow and advance the film the one frame. Upon retraction of the solenoid by the spring 77, the light spring 53 gives way to permit the film catch 55 to be removed from the aperture 83 and slide on its curved surface 82 along the film. In this embodiment, two frames are passed since stereo film is used. The movement is rapid enough that the catch passes over the next aperture stopping slightly behind it as shown in FIG. 4b. Upon actuation of the solenoid, as seen in FIG. 4c, the tendency of the spring member 51 to push inwardly towards the film together with the spring action of the light spring 53 serves to depress the catch mechanism 55 in the next perforation and moves it along with the film. The pointed edge 81 serves to assure that the catch inserts itself within the perforation as it passes. As can be seen thus upon the reciprocal motion of the solenoid and spring, the mechanism moves from one pair of frames to the next, pushing the film along as it does. In so moving the catch 55 slides along the film inserting itself in succeeding perforations.

The proposed device described can be constructed so as to effectively reproduce sound motion pictures. In such an instance, a small speaker, not shown, would be then present. A conventional photo-electric pick-up device could be utilized to reproduce the sound from the sound track of the film. Alternatively, a magnetic type head could be utilized for this purpose.

Obviously, many modifications and variations of the present invention are possible in the light of the above teachings. It is, therefore, to be understood that within the scope of the appended claims, the invention may be practiced otherwise than as specifically described.

What is claimed is:
1. A film advance mechanism comprising:
an elongated arm having rigid spring characteristics,
a second light spring affixed to one end of said arm,
a catch means rigidly secured to said light spring, said catch means of a configuration for engagement with perforations present in a film,
and means for causing said elongated arm to reciprocate whereby said catch means engages successive perforations in said film and pushing said film with said reciprocal movement, said means comprising:
an electric power source,
a solenoid operatively connected to one end of said power source, said solenoid being additionally affixed at the opposite end thereof to said elongated spring arm,
and means for causing said solenoid to return to a starting position after its actuation causing said arm to reciprocate.

2. The mechanism of claim 1 wherein said power source actuates said solenoid at time intervals longer than the time it takes said solenoid to complete its movement.

3. The mechanism of claim 2 wherein the ratio of said time of actuation to said time for movement of said solenoid is at least 3 to 1.

4. In a motion picture projector having an optical means for viewing an image a film advancing therethrough, and a light source to illuminate said film, the improvement which comprises:
a film advance mechanism comprising:
an elongated arm having rigid spring characteristics disposed parallel to the surface of said film,
a second light spring affixed to one end of said arm,
a catch means rigidly secured to said light spring, said catch means of a configuration for engagement with perforations present in a film wherein said light spring is curved to form essentially a right angle with said arm whereby said catch affixed to said light spring can be inserted in said perforations.

5. A compact motion picture projector comprising:
a first housing,
an optical system for displaying an image from a motion picture film disposed within said housing,
a light source situated in said housing,
means for said light to be emitted from said housing,
a film advance mechanism within said housing comprising an elongated arm having rigid spring characteristics disposed parallel to the surface of said film,
a second light spring affixed to one end of said arm,
a catch means rigidly secured to said light spring, said catch means of a configuration for engagement with perforations present in a film wherein said light spring is curved to form essentially a right angle with said arm whereby said catch affixed to said light spring can be inserted in said perforations.

References Cited by the Examiner

UNITED STATES PATENTS 2,834,832   5/1958   Somers _____ 352—191 X
3,139,789   7/1964   Schrader _____ 352—72

JULIA E. COINER, *Primary Examiner.*